United States Patent
Hardwick et al.

[11] Patent Number: 6,163,009
[45] Date of Patent: *Dec. 19, 2000

[54] PROCESS FOR OPERATING A PLASMA ARC TORCH

[75] Inventors: Steven F. Hardwick, John's Island; J. Travis Hardwick, Charleston, both of S.C.

[73] Assignee: Innerlogic, Inc., Charleston, S.C.

[ * ] Notice: This patent issued on a continued prosecution application filed under 37 CFR 1.53(d), and is subject to the twenty year patent term provisions of 35 U.S.C. 154(a)(2).

[21] Appl. No.: 09/178,206

[22] Filed: Oct. 23, 1998

[51] Int. Cl.$^7$ ........................................................ B23K 9/00
[52] U.S. Cl. ................................. 219/121.54; 219/121.57
[58] Field of Search ......................... 219/121.54, 121.57, 219/121.46, 121.5, 121.55, 121.44, 121.59

[56] References Cited

U.S. PATENT DOCUMENTS

| | | |
|---|---|---|
| 2,906,858 | 9/1959 | Morton, Jr. . |
| 3,082,314 | 3/1963 | Arata et al. . |
| 3,131,288 | 4/1964 | Browning . |
| 3,204,076 | 8/1965 | Browning . |
| 3,242,305 | 3/1966 | Kane et al. . |
| 3,272,962 | 9/1966 | Mauskapf . |
| 3,373,306 | 3/1968 | Karlovitz . |
| 3,403,211 | 9/1968 | Foex . |
| 3,476,906 | 11/1969 | Rovan . |
| 3,534,388 | 10/1970 | Takakiyo et al. . |
| 3,536,885 | 10/1970 | Mitchell . |
| 3,541,297 | 11/1970 | Sunnen et al. . |
| 3,567,898 | 3/1971 | Fein . |
| 3,575,568 | 4/1971 | Tateno . |
| 3,588,594 | 6/1971 | Yamamoto et al. . |
| 3,601,578 | 8/1971 | Gebel et al. . |
| 3,619,549 | 11/1971 | Hogan et al. . |
| 3,641,308 | 2/1972 | Couch, Jr. et al. . |
| 3,643,580 | 2/1972 | Siegel . |
| 3,644,782 | 2/1972 | Sheer et al. . |
| 3,770,935 | 11/1973 | Tateno et al. . |
| 3,787,247 | 1/1974 | Couch, Jr. . |

(List continued on next page.)

FOREIGN PATENT DOCUMENTS

| | | |
|---|---|---|
| 2135469 | 12/1972 | France . |
| 45-9853 | 4/1970 | Japan . |
| 47-30496 | 8/1972 | Japan . |
| 50-135721 | 11/1975 | Japan . |
| 51-16379 | 5/1976 | Japan . |
| 51-21945 | 7/1976 | Japan . |
| 52-36725 | 3/1977 | Japan . |
| 57-68270 | 4/1982 | Japan . |
| 57-165370 | 10/1982 | Japan . |
| 58-205676 | 11/1983 | Japan . |
| 59-141371 | 8/1984 | Japan . |
| 60-55221 | 12/1985 | Japan . |
| 62-28084 | 2/1987 | Japan . |
| 62-33025 | 7/1987 | Japan . |
| 63-101076 | 5/1988 | Japan . |
| 63-180378 | 7/1988 | Japan . |
| 64-83376 | 3/1989 | Japan . |
| 55144337 | 4/1991 | Japan . |
| 5104251 | 4/1993 | Japan . |
| 5082357 | 3/1995 | Japan . |
| 63-10082 | 1/1998 | Japan . |
| 274263 | 6/1970 | Russian Federation . |
| 1234104 | 5/1986 | Russian Federation . |
| 8900476 | 1/1989 | WIPO . |
| 9102619 | 3/1991 | WIPO . |

Primary Examiner—Teresa Walberg
Assistant Examiner—Quang Van
Attorney, Agent, or Firm—Dority & Manning, P.A.

[57] ABSTRACT

A process for operating a plasma arc torch on shut down includes decreasing current to the electrode from its initial operational value Io to a lesser intermediate value Im in a ramping function between times t1 and t2. Gas pressure within the plasma gas chamber is controlled between times t1 and t2 so that the gas pressure decreases from its operational value Po to a lesser intermediate value Pm substantially concurrently with the decreasing of current between times t1 and t2 and at a controlled rate such that plasma gas flow rate through the nozzle is maintained at least about its operational level Fo or greater between times t1 and t2. At time t2, current is shut off to the electrode.

13 Claims, 3 Drawing Sheets

U.S. PATENT DOCUMENTS

| | | |
|---|---|---|
| 3,833,787 | 9/1974 | Couch, Jr. . |
| 3,914,573 | 10/1975 | Muehlberger . |
| 3,949,188 | 4/1976 | Tateno . |
| 3,988,566 | 10/1976 | Vogts et al. . |
| 4,029,930 | 6/1977 | Sagara et al. . |
| 4,060,088 | 11/1977 | Morrison, Jr. et al. . |
| 4,133,987 | 1/1979 | Lakomsky et al. . |
| 4,163,891 | 8/1979 | Komatsu et al. . |
| 4,174,477 | 11/1979 | Essers et al. . |
| 4,195,216 | 3/1980 | Beauchamp et al. . |
| 4,203,022 | 5/1980 | Couch, Jr. et al. . |
| 4,275,287 | 6/1981 | Hiratake . |
| 4,282,418 | 8/1981 | Wuestner . |
| 4,291,217 | 9/1981 | Braun . |
| 4,341,941 | 7/1982 | Tateno . |
| 4,361,748 | 11/1982 | Couch, Jr. . |
| 4,382,170 | 5/1983 | Klingel . |
| 4,389,559 | 6/1983 | Rotolico et al. . |
| 4,410,788 | 10/1983 | Summers et al. . |
| 4,421,970 | 12/1983 | Couch, Jr. . |
| 4,506,136 | 3/1985 | Smyth et al. . |
| 4,521,666 | 6/1985 | Severance, Jr. et al. . |
| 4,567,346 | 1/1986 | Marhic . |
| 4,625,094 | 11/1986 | Marhic et al. . |
| 4,626,648 | 12/1986 | Browning . |
| 4,645,899 | 2/1987 | Bebber et al. . |
| 4,647,082 | 3/1987 | Fournier et al. . |
| 4,663,512 | 5/1987 | Kneeland et al. . |
| 4,692,582 | 9/1987 | Marhic . |
| 4,701,590 | 10/1987 | Hatch . |
| 4,743,734 | 5/1988 | Garlanov et al. . |
| 4,748,312 | 5/1988 | Hatch et al. . |
| 4,762,977 | 8/1988 | Browning . |
| 4,764,656 | 8/1988 | Browning . |
| 4,782,210 | 11/1988 | Nelson et al. . |
| 4,791,268 | 12/1988 | Sanders et al. . |
| 4,816,637 | 3/1989 | Sanders et al. . |
| 4,861,962 | 8/1989 | Sanders et al. . |
| 4,866,240 | 9/1989 | Webber . |
| 4,882,465 | 11/1989 | Smith et al. . |
| 4,902,871 | 2/1990 | Sanders et al. . |
| 4,909,914 | 3/1990 | Chiba et al. . |
| 4,918,283 | 4/1990 | Yamade et al. . |
| 5,013,885 | 5/1991 | Carkhuff et al. . |
| 5,017,752 | 5/1991 | Severance, Jr. et al. . |
| 5,023,425 | 6/1991 | Severance, Jr. . |
| 5,070,227 | 12/1991 | Luo et al. . |
| 5,089,221 | 2/1992 | Johansson et al. . |
| 5,105,061 | 4/1992 | Blankenship . |
| 5,120,930 | 6/1992 | Sanders et al. . |
| 5,132,512 | 7/1992 | Sanders et al. . |
| 5,164,568 | 11/1992 | Sanders . |
| 5,166,494 | 11/1992 | Luo et al. . |
| 5,170,033 | 12/1992 | Couch, Jr. et al. ................ 219/121.51 |
| 5,235,162 | 8/1993 | Nourbakhsh . |
| 5,317,126 | 5/1994 | Couch, Jr. et al. . |
| 5,393,952 | 2/1995 | Yamaguchi et al. . |
| 5,396,043 | 3/1995 | Couch, Jr. et al. . |
| 5,424,507 | 6/1995 | Yamaguchi . |
| 5,468,026 | 11/1995 | Annestedt . |
| 5,473,140 | 12/1995 | Colling . |
| 5,506,384 | 4/1996 | Yamaguchi ........................ 219/121.57 |
| 5,548,097 | 8/1996 | Couch, Jr. et al. ................ 219/121.57 |
| 5,591,357 | 1/1997 | Couch, Jr. et al. . |
| 5,624,586 | 4/1997 | Sobr et al. . |
| 5,653,895 | 8/1997 | Shintani ............................... 219/121.5 |
| 5,695,662 | 12/1997 | Couch, Jr. et al. . |
| 5,734,144 | 3/1998 | Yamaguchi et al. ............... 219/121.46 |
| 5,841,095 | 11/1998 | Lu et al. . |

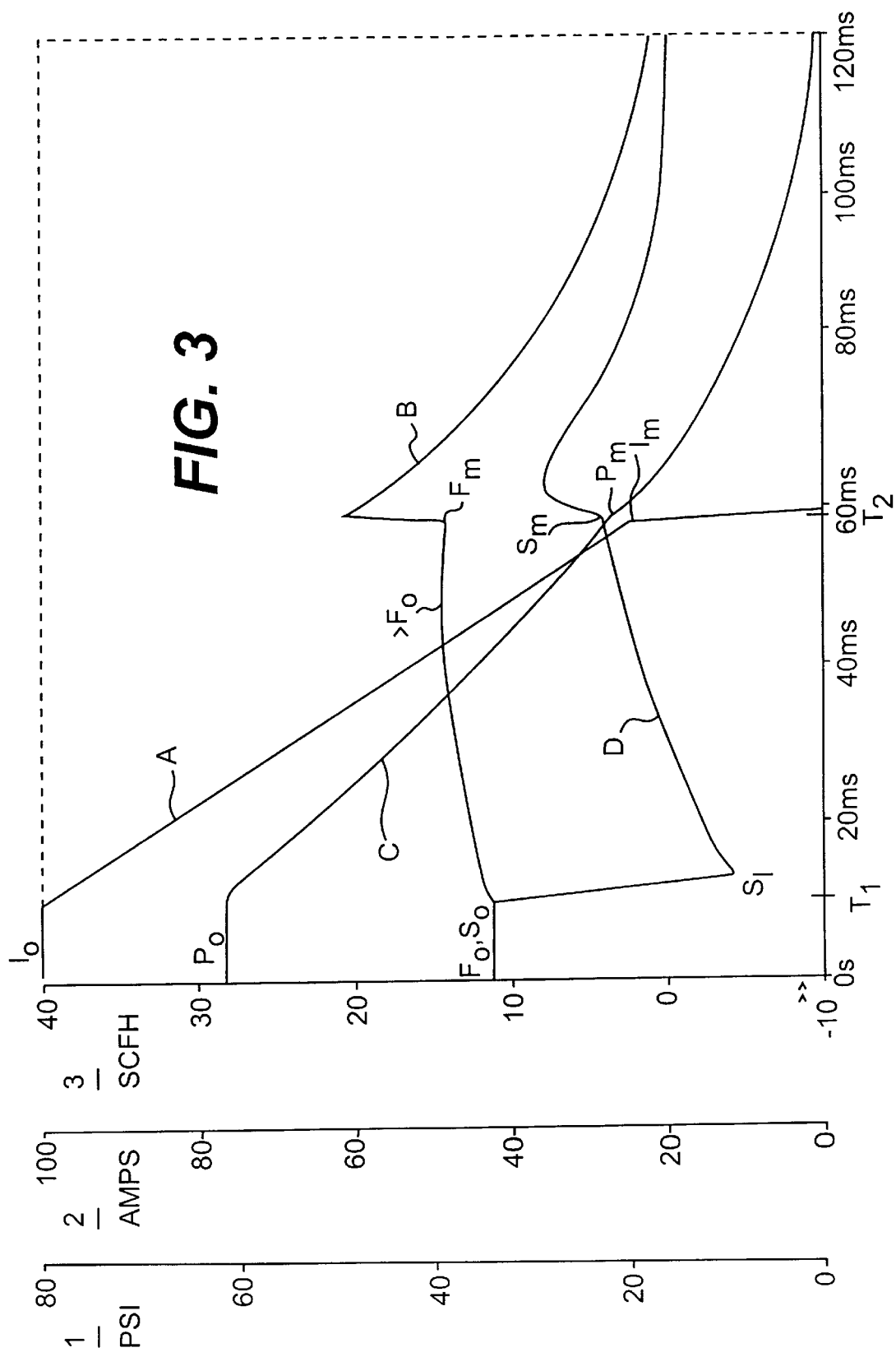

PROCESS FOR OPERATING A PLASMA ARC TORCH

BACKGROUND OF THE INVENTION

The present invention relates generally to a process for operating a plasma arc torch, and more particularly to a shut down process that extends the life of the electrode and nozzle.

The operation of conventional plasma arc torches is well understood by those in the art. The basic components of these torches are a body, an electrode mounted in the body, a nozzle defining an orifice for a plasma arc, a source of ionizable gas, and an electrical supply for producing an arc in the gas. As is well understood, upon start up an electrical current is supplied to the electrode (generally a cathode) and a pilot arc is initiated in the ionizable gas typically between the electrode and the nozzle, the nozzle defining an anode. Then, a conductive flow of the ionized gas is generated from the electrode to the work piece, wherein the work piece then defines the anode, and a plasma arc is thus generated from the electrode to the work piece. The ionizable gas can be non-reactive, such as nitrogen, or reactive, such as oxygen or air.

A common problem with conventional plasma arc torches is the significant wear of the electrodes and nozzles. Typically, the electrodes include a hafnium or zirconium insert. These materials are desired for their material properties when cutting with a reactive gas plasma, but are extremely costly and require frequent replacement. Typical plasma arc torches may incorporate cooling systems for the electrode, such as a cooling gas flow or water flow system for providing cooling fluids to the electrode. Although helpful, these cooling systems are not desirable in all applications of plasma arc torches and can limit the operational parameters of the torch.

The nozzle is another significant wear component. The nozzle is typically damaged by the plasma arc if the arc comes into contact with the nozzle once the plasma arc has been transferred to the work piece. In this regard, it is well known to induce a swirling component in the ionizable gas in the plasma gas chamber. This swirling gas flow stabilizes the plasma arc over its length from the electrode to the nozzle exit.

It has been found that a significant part of the electrode wear and nozzle damage actually occurs during shut down of the torch. It is believed that on cut off of electrical current to the electrode, wear results in a complicated interaction between molten surfaces of the electrode and the pressurized flow of the plasma gas through the nozzle. This phenomenon is also described in U.S. Pat. No. 5,070,227.

The '227 patent suggests a process for limiting the electrode wear upon shutdown of the torch wherein the mass flow rate of the plasma gas is reduced by closing off or reducing gas flow to the plasma chamber within a few hundred milliseconds before current is cut off to the electrode. The reduction in gas flow may be coupled with a venting of the plasma chamber to atmosphere to facilitate a more rapid change in the gas flow pattern in the plasma chamber. The '227 patent also teaches to alter the gas flow pattern by terminating the operational swirling flow and generating a generally radial flow at the input to the plasma chamber which becomes an axial flow through the chamber. This switch from the swirling flow to the radial/axial flow is in conjunction with the overall reduction in the flow rate and the decline in current level to the electrode. The '227 patent proposes that by substitution to a more axial flow, a higher overall mass flow rate can be tolerated at the time just preceding current cut off than with a swirling flow.

The present invention relates to a shutdown process for plasma arc torches that also minimizes electrode wear and damage to the nozzle.

OBJECTS AND SUMMARY OF THE INVENTION

It is therefore a principal object of the present invention to provide a process for shutting down a plasma arc torch that significantly reduces wear on the electrode and minimizes the possibility of damage to the nozzle.

An additional object of the present invention is to provide a process for shutting down conventional plasma arc torches that can be readily practiced by conventional torches with relatively minor modifications.

Additional objects and advantages of the invention will be set forth in part in the following description, or may be obvious from the description, or may be learned through practice of the invention.

In accordance with the objects and purposes of the invention, a process is provided for operating a plasma arc torch on shutdown. The process operates on the principle of actually maintaining the plasma gas flow rate through the nozzle at substantially the same or a higher flow rate during the time that current to the electrode is reduced from an operational current level. Also, the present process preferably sustains swirling plasma gas flow during the shutdown process. For example, in a preferred embodiment of the process, swirling gas flow is brought to a rate of at least 30% of the normal swirling gas flow rate under operational conditions by the time the electrode current is ramped down or otherwise reduced. The swirling gas flow is necessary to maintain the stability of the plasma arc during shutdown so that the nozzle is not damaged. As will be discussed in greater detail herein, the swirling gas flow does not degrade or unnecessarily wear the electrode during the shutdown process in accordance with the invention.

In one preferred embodiment of the process, in the operational cutting mode of the plasma torch prior to shutdown, current to the electrode is maintained at an operational current value Io. Plasma gas flow through the nozzle is maintained at an operational flow rate Fo, and pressure of the plasma gas within the gas chamber is maintained at an initial pressure Po. For shutdown, current to the electrode is decreased from Io to a lesser intermediate value Im, for example in a ramping function, between times t1 and t2 causing the plasma arc diameter to diminish accordingly. By reducing the current to the intermediate value Im, the effective diameter of the plasma arc in relation to the diameter of the electrode decreases as the current level decreases. It is believed that this allows any molten material on the surface of the electrode to solidify as the effective diameter of the arc decreases radially inward. Also, with all other factors being constant, plasma gas flow rate through the nozzle would increase as current decreases.

The gas pressure within the plasma gas chamber is decreased from its initial pressure Po to a lesser intermediate value Pm with decreasing of the current to the electrode from times t1 to t2 at a controlled non-step rate. The pressure within the gas chamber is decreased at a rate so as to maintain plasma gas flow through the nozzle at least at a value of Fo or greater between times t1 and t2. Finally, current is shut off to the electrode at about time t2, preferably in a step function, and plasma gas pressure may then be allowed to decrease from the intermediate value Pm to zero with plasma gas flow rate through the nozzle also decreasing in a non-step function from its value at time t2 to zero. Alternatively, plasma gas flow need not be terminated and may, for example, be reduced to a lesser rate at time t2 or even maintained at its level at time t2.

In a preferred process according to the invention, pressure within the gas chamber is reduced concurrently with decreasing current to the electrode by venting the supply of plasma gas to the gas chamber at a rate coordinated with the decreasing size of the plasma arc. In this way, gas pressure is controlled to the extent necessary to maintain the plasma gas flow rate through the nozzle at the value of its operational level or slightly greater.

In a preferred embodiment of the present process, the swirl rate of the plasma gas is maintained at an operational rate of So and is reduced to a lesser magnitude Sm that is greater than zero between times t1 and t2 during the ramp down of current to the electrode. In other words, swirl rate is always maintained during the shut down process. In a preferred embodiment of the process, the swirl rate is at a level generally greater than 30% of its operational swirl rate So at time t2. In this embodiment, the swirl rate may be decreased to an intermediate magnitude Si between times t1 and t2 and then increased to swirl rate Sm generally by time t2. In this embodiment, the swirl flow may actually be reversed by controlling the pressure differential across the swirl ring by venting the plasma gas supply. In this embodiment, the swirl rate would then change direction from the reversed flow and increase to the intermediate level Sm at about time t2 once pressure at the nozzle decreases below that at the vent point. This swirl flow is preferred in that it stabilizes the plasma arc during the shut down process thereby minimizing any damage to the nozzle.

The invention will be explained in greater detail below through use of the appended drawings.

BRIEF DESCRIPTION OF THE DRAWINGS

FIG. 3 is a more detailed timing graph particularly illustrating electrode current, nozzle flow rate, gas pressure, and swirl flow rate.

DETAILED DESCRIPTION

Figure 1:
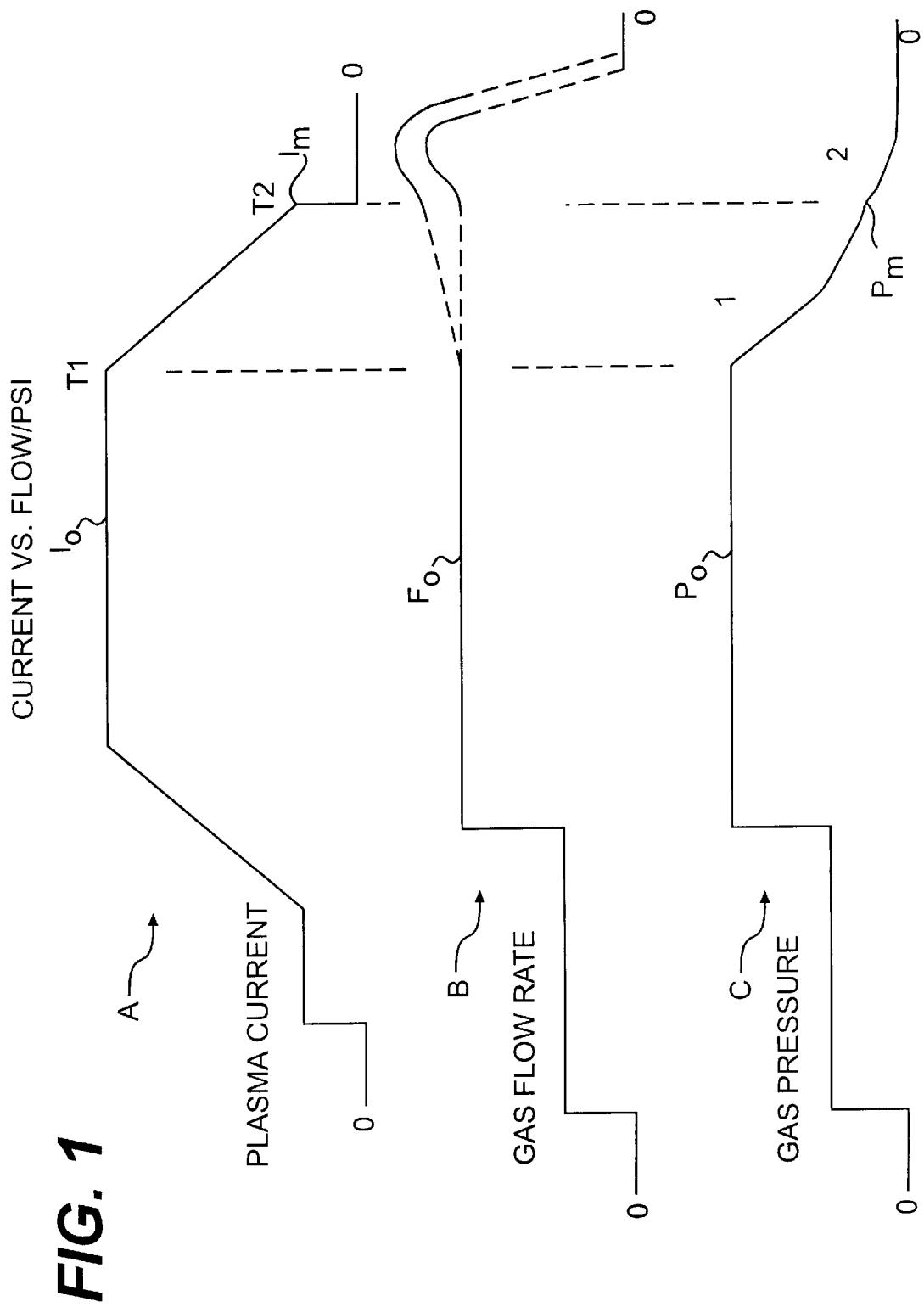
FIG. 1 is a timing graph illustrating the various changes in electrode current, gas flow rate, and gas pressure.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment, can be used with another embodiment to yield still a further embodiment. It is intended that the present invention include such modifications and variations as come within the scope of the invention.

Figure 2:
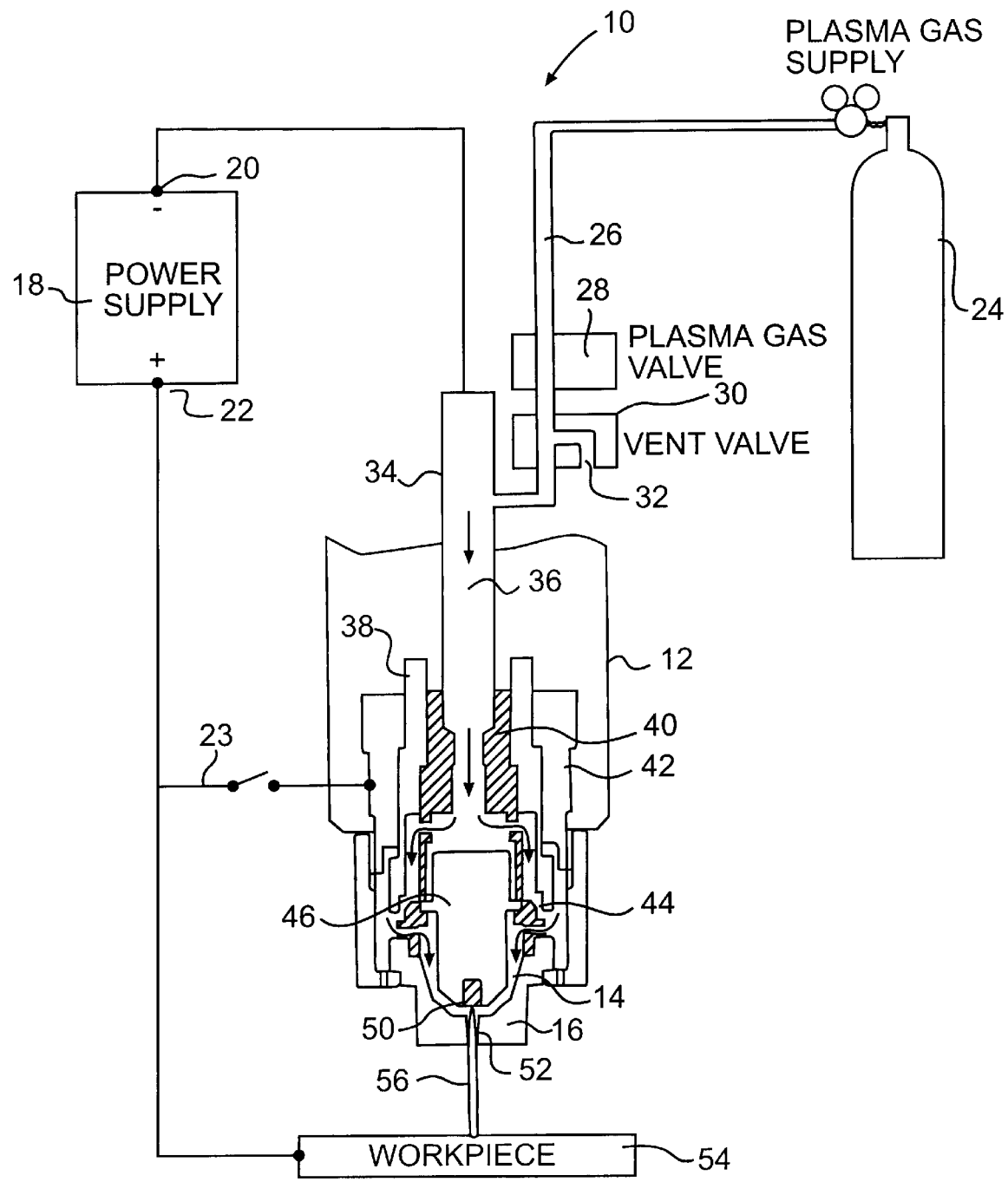
FIG. 2 is a simplified schematic view of a conventional plasma arc torch constructed to operate according to the present invention.

FIG. 2 is a simplified schematic view of a conventional plasma arc torch, similar to the FL 100 plasma arc torch provided by InnerLogic Incorporated of Charleston, S.C. It should be appreciated, however, that the present inventive method is not limited to any particular type of plasma arc torch and may be practiced by any manner of conventional torches. For example, U.S. Pat. No. 5,070,227 describes a control process for a variety of models of torches, including torches sold by HyperTherm, Inc. of Hanover, New Hampshire. The present invention is applicable to the types of torches described in the '227 patent and the '227 patent is herein incorporated by reference into this specification in its entirety for all purposes.

The operation of conventional torches is well understood by those skilled in the art and a detailed explanation thereof is not necessary for purposes of this disclosure. The following description is for background purposes relating to conventional plasma arc torches in general.

Referring to FIG. 2, plasma arc torch 10 has a basic body, generally indicated as 12. Body 12 includes a torch supply tube 34 defining a supply chamber 36 that is supplied with a source of pressurized ionizable gas from gas supply 24 through gas supply line 26. A remotely actuated valve, such as solenoid valve 28, is disposed in line between supply tube 34 and gas source 24 to shut off the supply of gas to torch 10 upon actuation of the valve. As is appreciated by those skilled in the art, the plasma gas may be non-reactive, such as nitrogen, or reactive, such as oxygen or air.

Torch body 12 includes an electrode body 46, typically formed from copper. An electrode insert or element 50 is fitted into the lower end of electrode body 46. Element 50 is typically formed of hafnium or zirconium, particularly when a reactive gas is used as the plasma gas.

An insulating body 38 generally surrounds the supply tube 34 and electrode body 46. A cathode body 40 is disposed generally surrounding supply tube 34 and an anode body 42 is disposed surrounding insulating body 38.

A nozzle 16 is disposed at the forward end of electrode body 46 and defines an arc passageway 52 aligned with electrode element 50.

A swirl ring 44 is disposed around the electrode body 46 and has holes defined therein to induce a swirling component to plasma gas entering plasma gas chamber 14, as will be discussed in greater detail below.

A power supply 18 is provided to supply electrical current to electrode body 46 and electrode element 50. A negative power lead 20 is in electrical communication with supply tube 34 and cathode body 40. In a pilot arc mode, a positive power lead 22 is in electrical communication with anode body 42 through switch 23. Insulating body 38 electrically isolates anode body 42 from cathode body 40. Positive power lead 22 is also connectable to a work piece 54 that is to be cut by the plasma torch once switch 23 is opened. Power supply 18 may constitute any conventional DC power supply sufficient to provide current to the torch at an appropriate voltage to initiate the pilot arc and then maintain the arc in the operational cutting mode of the torch.

In operation, plasma gas flows from source 24, through supply line 26 and shut off valve 28 into chamber 36 of supply tube 34, as generally indicated by the arrows. The plasma gas flows downward in chamber 36 through orifices in the cathode body and orifices in swirl ring 44 before entering the lower plasma gas chamber 14. It should be understood that lower plasma gas chamber 14 is in pneumatic communication with the entirety of the supply chamber 36 of supply tube 34 so that a change in pressure anywhere within the system will effect a change in pressure within lower plasma gas chamber 14. In operation, a differential pressure exists between supply chamber 36 and lower plasma chamber 14 so that the plasma gas flows from supply chamber 36, through swirl ring 44, and out nozzle 16 with a swirling component induced thereto.

In the pilot arc mode of torch 10, switch 23 is closed so that the positive lead is connected to anode body 42. Power supply 20 provides current at the appropriate voltage to initiate the pilot arc between electrode element 50 and nozzle 16. A desired plasma gas flow and pressure are set by the operator for initiating the pilot arc. The pilot arc is started by a spark or other means, such as a contact starting technique, all of which are known in the art.

The plasma gas flow during the pilot arc mode is from supply 24, through supply line 26 and solenoid valve 28, into supply chamber 34, through orifices in cathode body 40, through the holes in swirl ring 44, into lower plasma chamber 14, and out through arc passageway 52 of nozzle 16. The swirling flow generated by swirl ring 44 is desired as a means for stabilizing the arc in the operational cutting mode so that the arc does not impinge on and damage the nozzle.

In order to transfer torch 10 to the cutting mode, the torch is brought close to work piece 54 so that the arc transfers to the work piece 54 as switch 23 opens so that positive power is fed only to work piece 54. The current is increased to a desired level for cutting such that a plasma arc 56 is generated which extends through arc passageway 52 to work piece 54. The operational current levels depend on the type of torch and application desired, and typically range from about 20 to about 200 amps.

As the operational current is increased, the plasma gas within lower plasma chamber 14 heats up and a decrease in plasma gas flow out of nozzle 16 results. In order to sustain sufficient plasma gas flow through nozzle 16 to sustain the plasma arc 56, pressure of the plasma gas being supplied must be increased with the increase of current.

The shut down process according to the present invention will now be described in greater detail through the use of the timing diagrams of FIGS. 1 and 3.

FIG. 1 illustrates the basic conceptual timing phases according to the invention. Start-up of the plasma arc torch is generally referenced by the left hand side of the graphs. Graph A illustrates plasma arc current. After the plasma arc has been transferred to the work piece, the plasma arc current is maintained at its operational current value Io. Graph B represents plasma gas flow rate through the nozzle. At operational conditions of the plasma arc torch, this gas flow rate is maintained at its operational value Fo. Likewise, graph C represents gas pressure of the plasma gas within the plasma gas chamber 14 defined generally between the swirl ring 44 and the nozzle 16. At operational steady state values, this gas pressure has a value of Po.

The shut down process is initiated at time t1 wherein plasma arc current is reduced, for example by being ramped down, to an intermediate value Im between times t1 and t2. This ramping down or decrease of the plasma arc current will cause the plasma arc 56 generated at electrode element 50 to correspondingly decrease in its effective diameter. It is believed that this corresponding decrease in the size of the plasma arc will permit any molten material at the electrode insert 50 to harden or solidify around its circumference as the plasma arc diminishes in size. It is further believed that any remaining molten insert material will essentially be encased or protected by the solidifying material so that plasma gas flow, including swirl flow, will not degrade or wear away at any molten material on the circumference of the electrode insert.

Substantially simultaneously with the decrease in electrode current at time t1, gas pressure Po within the plasma gas chamber is decreased in a controlled non-step function, such as a ramp function, between times t1 and t2. At time t1, the solenoid shut off valve 28 is also shut so that pressurized plasma gas is no longer supplied to supply chamber 36. Thus, gas pressure within plasma gas chamber 14 would tend to decrease because of this factor alone and gas flow rate through the nozzle would also accordingly tend to decrease. However, the reduction in size of the plasma arc due to the decreasing electrode current has a counter effect. As the size of the plasma arc diminishes, the effective vent path or opening through nozzle 16 becomes increasingly larger so that the pressurized plasma gas remaining in plasma gas chamber 14 would tend to escape from the plasma gas chamber at an increasingly faster rate. This phenomena may be increased also by a decrease in temperature of the gas as the arc diminishes. Accordingly, plasma gas flow rate through the nozzle would actually have a significant jump just after time t1 when the plasma gas valve 28 is shut and the size of the plasma arc rapidly diminishes. Flow rate through the nozzle would have a significant increase and then a substantial abrupt decrease to zero. This would be an undesired situation.

Referring particularly to graph B in FIGS. 1 and 3, it can be seen that flow rate through the nozzle starting at time t1 is maintained at a value at least as great as Fo or slightly greater between times t1 and t2. This flow profile is achieved by controlling the pressure within the plasma gas chamber 14 between the critical times t1 and t2. In a preferred embodiment of the invention, vent valve 30 (FIG. 2) is opened simultaneously with the closing of solenoid shut off valve 28. Vent valve 30 has an orifice 32 of predetermined size so that a precisely controlled venting of the supply of gas to plasma chamber 14 by way of supply chamber 36 is initiated at time t1. By venting the gas supply at time t1, the differential pressure across swirl ring 44 is actually briefly reversed so that swirl flow through the ring 44 is reversed, as can be particularly seen by graph D in FIG. 3. Graph D represents swirl flow through swirl ring 44, and it can be seen that immediately after time t1, swirl flow reduces to an intermediate reversed or negative value Sm. This has the effect of essentially dampening what would be a sudden release or escape of the plasma gas from plasma gas chamber 14 as arc 56 diminishes in size between times t1 and t2. In other words, since the pressure at the vent point is less than the pressure at nozzle 16, the effective gas pressure within plasma chamber 14 is reduced as a portion of the plasma gas actually reverses through swirl ring 44. Thus, referring to graph B in FIG. 3, it can be seen that plasma flow is maintained at its operational value Fo or slightly greater between times t1 and t2. FIG. 3 illustrates plasma flow as being slightly increased above value Fo. This curve could be flattened or dampened even further by increasing the size of vent orifice 32, or otherwise venting the supply of gas or chamber 36 in an additional manner.

As the size of the plasma arc continues to diminish between times t1 and t2, the effective pressure at the nozzle will decrease below that at the vent location and the differential pressure across swirl ring 44 will again reverse, as can be particularly seen by graph D in FIG. 3. From this time forward, substantially all of the plasma gas remaining within supply chamber 36 and plasma gas chamber 14 will vent through the forward end of nozzle 16. Swirl flow will accordingly increase and, by the time t2 is reached, swirl flow will preferably be at least about 30% of its operational value 50. Plasma gas flow through the nozzle will also tend to flatten out as time t2 is approached, as can be particularly seen by graph B in FIG. 3.

Thus, at time t2, electrode current has been reduced to its intermediate value Im, gas pressure within the plasma gas chamber 14 has been reduced to its intermediate value Pm, and gas flow rate through the nozzle is at its intermediate value Fm at or above the operational value Fo. At time t2, current to the electrode is completely shut off in a step function and any remaining arc will immediately extinguish. Thus, pressure within chamber 14 will also decrease accordingly to zero at a different higher rate after time t2 than between times t1 and t2, as can be particularly seen by graph C in FIG. 3. At time t2, plasma gas flow rate through the nozzle and swirl flow rate will jump once the plasma arc is extinguished and then will subsequently taper off to zero. Alternatively, at time t2 plasma gas flow through the nozzle may be maintained. It is not necessary after current is terminated at time t2 to also terminate plasma gas flow, and it may be desired in certain operations to actually continue plasma gas flow.

It should be appreciated by those skilled in the art that an important feature of the invention is the precise control of the plasma gas pressure within the plasma gas chamber between times t1 and t2, for example by controlling the differential pressure across the swirl ring between these critical times. The present invention also maintains a substantially high gas flow rate through the nozzle with a substantial swirl component to stabilize the plasma arc and prevent nozzle damage with minimal risk of removing or wearing away any molten electrode material with the plasma gas flow.

While various values for the process as described herein are depicted in FIG. 3, it should be appreciated that these values will depend on the specific torch, torch applications, and related parameters. It is within the level of skill of those in the art to empirically determine such values in accordance with the teachings of this specification.

Thus, it should be appreciated that various modifications and variations can be made in the present invention without departing from the scope or spirit of the invention. It is intended that the present invention include such modifications and variations as come within the scope of the appended claims and their equivalents.

What is claimed is:

1. A process for operating a plasma arc torch on shut down, the plasma arc torch having a plasma gas chamber supplied with a plasma gas, an electrode supplied with current for generating a plasma cutting arc by ionization of the plasma gas, and a nozzle disposed in front of the electrode through which the plasma cutting arc extends to a workpiece, in an operational cutting mode of the torch the plasma gas within the plasma gas chamber having a swirl component imparted thereto for stabilization of the plasma cutting arc exiting the nozzle, said process comprising:

in the operational cutting mode of the plasma torch prior to shut down, maintaining current to the electrode at an operational current value Io, plasma gas flow through the nozzle at an operational flow rate Fo, and pressure of the plasma gas within the plasma gas chamber at an initial pressure of Po;

decreasing current to the electrode from Io to a lesser intermediate value Im in an essentially ramping function between times t1 and t2, said decreasing current causing the plasma arc to diminish accordingly;

reducing gas pressure within the plasma gas chamber between times t1 and t2 by venting at a controlled rate so that plasma gas pressure decreases from Po to a lesser intermediate value Pm substantially concurrently with said decreasing of current to the electrode from times t1 to t2, said venting controlled such that plasma gas flow rate through the nozzle is maintained at least at about Fo between times t1 and t2; and shutting off current to the electrode at about time t2 and allowing plasma gas pressure to decrease from Pm to zero and plasma gas flow rate through the nozzle to decrease from its value at about time t2 to zero.

2. The process as in claim 1, wherein the plasma torch includes a swirl ring through which the plasma gas passes prior to entering the plasma gas chamber for imparting the swirl component to the plasma gas in the operational cutting mode of the plasma torch at an operational swirl rate of So, said step of reducing gas pressure within the plasma gas chamber further comprising controlling a differential pressure across the swirl ring so that swirl rate is reduced from So to a lesser magnitude Sm greater than zero between times t1 and t2.

3. The process as in claim 2, wherein the lesser value swirl rate Sm at about time t2 is generally at least about 30% of operational swirl rate So.

4. The process as in claim 2, wherein said controlling the differential pressure across the swirl ring causes swirl rate to decrease to an intermediate magnitude Si between times t1 and t2 and then increase to magnitude Sm generally at time t2.

5. The process as in claim 4, wherein swirl flow through the swirl ring is reversed at magnitude Si as flow through the nozzle is maintained at about Fo.

6. The process as in claim 1, wherein said reducing gas pressure within the plasma gas chamber between times t1 and t2 comprises decreasing gas pressure from Po to Pm in a controlled first non-step function.

7. The process as in claim 1, further comprising allowing plasma gas pressure to decrease from Pm to zero and plasma gas flow rate through the nozzle to decrease from its value at about time t2 to zero.

8. The process as in claim 7, wherein said decreasing of gas pressure from Pm to zero beginning at about time t2 comprises decreasing gas pressure in second non-step function that is different than the first non-step function.

9. The process as in claim 1, wherein said reducing gas pressure within the plasma gas chamber between times t1 and t2 comprises venting the supply of plasma gas to the gas chamber at a controlled rate starting at about time t1 so that gas flow rate through the nozzle stays at Fo or greater between times t1 and t2 as the size of the plasma arc decreases with said decreasing of current to the electrode.

10. The process as in claim 9, wherein the plasma torch includes a swirl ring through which the plasma gas passes prior to entering the plasma gas chamber for imparting the swirl component to the plasma gas in the operational cutting mode of the plasma torch at an operational swirl rate of So, said venting comprising controlling the differential pressure of the plasma gas across the swirl ring so that at about time t1 plasma gas flow through the swirl ring initially decreases and reverses as plasma gas flow through the nozzle is maintained at least about at Fo.

11. The process as in claim 10, wherein after the swirl flow reverses, pressure generally at the nozzle decreases below that at the venting location and swirl flow reverses again and increases to a value of at least about 30% of its operational swirl rate So.

12. The process as in claim 1, wherein said shutting off of current to the electrode at time t2 is done in a step function.

13. A process for operating a plasma arc torch on shut down, the plasma arc torch having a plasma gas chamber supplied with a plasma gas, an electrode supplied with current for generating a plasma cutting arc by ionization of the plasma gas, and a nozzle disposed in front of the electrode through which the plasma cutting arc extends to a workpiece, the plasma torch further including a swirl plate through which the plasma gas passes prior to entering the plasma gas chamber for imparting a swirl component to the plasma gas in the operational cutting mode of the plasma torch at an operational swirl rate of So, said process comprising:

in the operational cutting mode of the plasma torch prior to shut down, maintaining current to the electrode at an operational current value Io, plasma gas flow through the nozzle at an operational flow rate Fo, and pressure of the plasma gas within the plasma gas chamber at an initial pressure of Po;

decreasing current to the electrode from Io to a lesser intermediate value Im in an essentially ramping function between times t1 and t2, said decreasing current causing the plasma arc to diminish accordingly;

reducing gas pressure within the plasma gas chamber between times t1 and t2 so that plasma gas pressure decreases from Po to a lesser intermediate value Pm substantially concurrently with said decreasing of current to the electrode from times t1 to t2 and at a rate such that plasma gas flow rate through the nozzle is maintained at least at about Fo between times t1 and t2;

said step of reducing gas pressure within the plasma gas chamber further comprising controlling a differential pressure across the swirl plate so that swirl rate is reduced from So to at least about 30% of So at time t2; and wherein said reducing gas pressure within the plasma gas chamber between times t1 and t2 comprises venting the supply of plasma gas to the gas chamber at a controlled rate starting at about time t1 so that gas flow rate through the nozzle stays at least about Fo between times t1 and t2 as the size of the plasma arc decreases with said decreasing of current to the electrode.

* * * * *